United States Patent
Duan et al.

(10) Patent No.: US 7,459,682 B2
(45) Date of Patent: Dec. 2, 2008

(54) SPIN-POLARIZED ELECTRON SOURCE AND SPIN-POLARIZED SCANNING TUNNELING MICROSCOPE

(75) Inventors: Wen-Hui Duan, Beijing (CN); Shao-Gang Hao, Beijing (CN); Gang Zhou, Beijing (CN); Jian Wu, Beijing (CN); Bing-Lin Gu, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 111 days.

(21) Appl. No.: 11/559,842

(22) Filed: Nov. 14, 2006

(65) Prior Publication Data
US 2008/0073554 A1 Mar. 27, 2008

(30) Foreign Application Priority Data
May 19, 2006 (CN) .......................... 200610060733

(51) Int. Cl.
*G01N 23/00* (2006.01)

(52) U.S. Cl. .................. 250/306; 250/307; 250/310; 250/311; 313/309; 313/310; 313/311; 313/493; 313/498; 977/815; 977/822; 977/838; 977/849; 977/860; 977/861

(58) Field of Classification Search .................. 250/306, 250/307, 310, 311; 313/309, 310, 311, 493; 313/498; 977/815, 822, 838, 849, 860, 861
See application file for complete search history.

(56) References Cited

U.S. PATENT DOCUMENTS

| 4,985,627 A | 1/1991 | Gutierrez et al. | |
|---|---|---|---|
| 6,750,450 B2 | 6/2004 | Mukasa et al. | |
| 7,388,201 B2* | 6/2008 | Cholewa et al. | 250/310 |
| 2003/0042833 A1* | 3/2003 | Trujillo et al. | 313/309 |

FOREIGN PATENT DOCUMENTS

JP 2002-202238 A 7/2002

OTHER PUBLICATIONS

Hao, et al "Tremendous Spin-Splitting Effects in Open Boron Nitride Nanotubes: Application to Nanoscale Spintronic Devices" J. Am. Chem. Soc. 128 pp. 8453-8458, 2006.*

* cited by examiner

*Primary Examiner*—Jack I. Berman
*Assistant Examiner*—Michael Maskell

(57) ABSTRACT

An exemplary spin-polarized electron source includes a cathode, and a one-dimensional nanostructure made of a compound (e.g., group III-V) semiconductor with local polarized gap states. The one-dimensional nanostructure includes a first end portion electrically connected with the cathode and a second end portion located/directed away from the cathode. The second end portion of the one-dimensional nanostructure functions as a polarized electron emission tip and is configured (i.e., structured and arranged) for emitting a spin-polarized electron current/beam under an effect of selectably one of a magnetic field induction and a circularly polarized light beam excitation when a predetermined negative bias voltage is applied to the cathode. Furthermore, a spin-polarized scanning tunneling microscope incorporating such a spin-polarized electron source is also provided.

19 Claims, 5 Drawing Sheets

SPIN-POLARIZED ELECTRON SOURCE AND SPIN-POLARIZED SCANNING TUNNELING MICROSCOPE

BACKGROUND

1. Technical Field

The present invention relates generally to a spintronics area and, more particularly, to spin-polarized electron sources and spin-polarized scanning tunneling microscopes incorporating the same.

2. Description of Related Art

Spintronics (a neologism for "spin-based electronics"), also known as magneto-electronics, is an emergent technology which exploits the quantum propensity of electrons to spin as well as making use of their charge states. The spin itself is manifested as a detectable weak magnetic energy state characterized as "spin-up" and "spin-down". One proposed spintronic device is a spin-polarized scanning tunneling microscope tip (SP-STM tip) used in a spin-polarized scanning tunneling microscope (SP-STM). In SP-STM, the SP-STM tip and a sample separated by a vacuum gap (usually in a range from 0.1 to 10 nanometers) have spin-polarized surface electron states, and usually the SP-STM tip acts as a spin-polarized electron source and the sample correspondingly acts as a spin sensitive electron receiver. Based on the operation of the SP-STM, spin-dependent tunneling currents are recorded locally as a function of the position of the SP-STM tip to produce a spin-dependent image, whereby a surface magnetic structure of the sample can be obtained. More detailed information on the configuration and the operation of the SP-STM is taught in U.S. Pat. No. 4,985,627 entitled "Spin-Polarized Scanning Tunneling Microscope", which is incorporated herein by reference. So far, there are two typical spin-polarized electron sources can be used as the SP-STM tip. Structures of the two spin-polarized electron sources will be described in detailed as follows.

Regarding one typical spin-polarized electron source, a multi-layer structure, in which cesium (Cs) layers and oxygen (O) layers are alternately laminated, is deposited on a surface of a p-type gallium arsenide (GaAs) layer, in order to produce a negative electron affinity. Electrons can be extracted from the surface of the GaAs layer by irradiating it with a circularly polarized laser beam having an energy substantially equal to the forbidden band of GaAs. However, in the band structure of the three-dimensional GaAs layer, a band for heavy holes and a band for light holes are degenerated in the valence band, and, therefore, a ratio of spin-down electrons to spin-up electrons is 3:1 because of the difference in transition probability when electrons are excited from these bands to the conduction band. For this reason, there is only a maximum polarization of 50% can be obtained.

As to another one typical spin-polarized electron source, a macroscopic tungsten tip, covered with a fine film (approximately 50 nanometers thick) of an insulating material, is provided. The insulating material, such as EuS, is ferromagnetic at a very low temperature. EuS, in particular, is a ferromagnetic insulator with a Curie temperature of 16.5 K (Kelvin). By raising the voltage in the tungsten tip to several kilovolts with respect to an anode and subjecting the tungsten tip to a magnetic field parallel thereto, electrons can be extracted from the fine film by field effect and acquire, on passing through the EuS layer, a spin polarization. A degree of polarization of up to about 86% can be obtained at an operation temperature of 9 K.

Generally, for practical spin-polarized electron sources, it is crucial to realize continuous and efficient emission of a spin-polarized electron current/beam at room temperature. However, the conventional spin-polarized electron sources, as mentioned above, clearly would not meet the requirement.

Therefore, what is needed is to provide a spin-polarized electron source, which can realize continuous and efficient emission of a spin-polarized electron current/beam at room temperature, and a spin-polarized scanning tunneling microscope incorporating such a spin-polarized electron source therein.

SUMMARY

A preferred embodiment provides a spin-polarized electron source. The spin-polarized electron source includes: a cathode and a one-dimensional nanostructure of a group III-V compound semiconductor with local polarized gap states. The one-dimensional nanostructure includes a first end portion electrically connected with the cathode and a second end portion located/directed away from the cathode. The second end portion of the one-dimensional nanostructure functions as a polarized electron emission tip and is configured (i.e., structured and arranged) for emitting a spin-polarized electron current/beam under an effect of selectably one of a magnetic field induction and a circularly polarized light beam excitation when a predetermined negative bias voltage is applied to the cathode.

Another preferred embodiment provides a spin-polarized scanning tunneling microscope configured for investigating a domain structure of a magnetic sample. The spin-polarized scanning tunneling microscope includes: a probe, a positioning driver, a current detecting device, and a controller. The probe is disposed opposite to a surface of the magnetic sample separated therefrom by a vacuum gap. The probe includes a one-dimensional nanostructure of a group III-V compound semiconductor with local polarized gap states. The one-dimensional nanostructure has an end portion adjacent to the surface of the magnetic sample, the end portion thereof acting as a probe tip of the probe. The end portion adjacent to the surface of the magnetic sample is configured for emitting a spin-dependent tunneling current under an effect of selectably one of a magnetic field induction and a circularly polarized light beam excitation when a working voltage is applied to the probe and the magnetic sample. The positioning driver is configured for causing a relative movement between the probe and the magnetic sample to enable the probe tip to scan across the surface of the magnetic sample. The current detecting device is configured for detecting the tunneling current generated between the probe tip and the magnetic sample. The controller is configured for receiving the tunneling current from the current detecting device and signaling a feed back signal to the positioning driver in order to regulate the relative movement between the probe and the magnetic sample.

Other advantages and novel features will become more apparent from the following detailed description of embodiments when taken in conjunction with the accompanying drawings.

BRIEF DESCRIPTION OF THE DRAWINGS

Many aspects of the present spin-polarized electron source and spin-polarized scanning tunneling microscope can be better understood with reference to the following drawings. The components in the drawings are not necessarily drawn to scale, the emphasis instead being placed upon clearly illustrating the principles of the present spin-polarized electron source and scanning tunneling microscope. Moreover, in the drawings, like reference numerals designate corresponding parts throughout the several views.

The exemplifications set out herein illustrate various preferred embodiments, in various forms, and such exemplifications are not to be construed as limiting the scope of the present spin-polarized electron source and scanning tunneling microscope in any manner.

DETAILED DESCRIPTION

Figure 1:
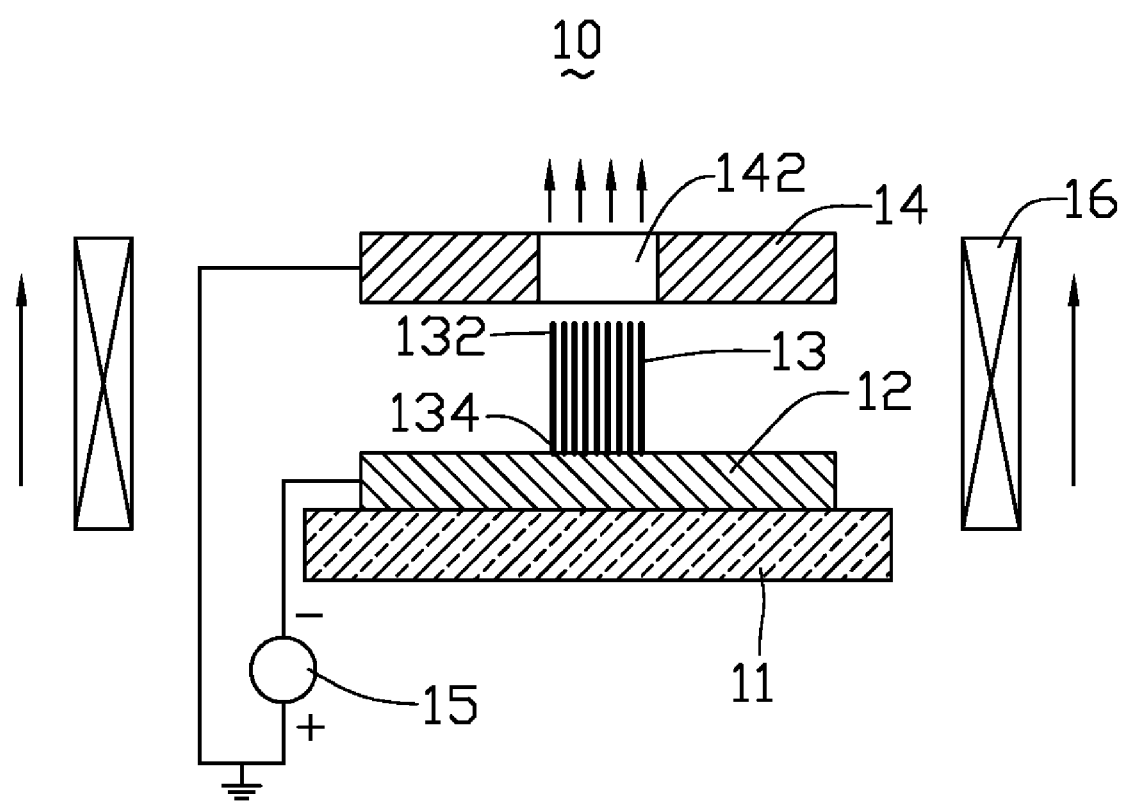
FIG. 1 is a schematic, cross-sectional view of a spin-polarized electron source, in accordance with a first preferred embodiment.

Referring to FIG. 1, a spin-polarized electron source 10, in accordance with a first preferred embodiment, is provided. The spin-polarized electron source 10 can realize continuous and efficient emission of a spin-polarized electron current/beam under an effect of a magnetic field induction. Specifically, the spin-polarized electron source 10 includes: a glass substrate 11, a cathode 12, one-dimensional (i.e., one dimension predominating) nanostructures 13 of group III-V compound semiconductors with local occupied polarized gap states (i.e., polarized gap states being occupied by electrons and being localized), an anode 14, and a magnetic field generator 16.

The cathode 12 is disposed on the glass substrate 11. The cathode 12 is suitably made from an electrically conductive material, including, for example, a tin indium oxide, a n-type doped silicon, or a p-type doped silicon.

The one-dimensional nanostructures 13 made of at least one group III-V compound semiconductor are electrically connected with the cathode 12. In particular, each of the one-dimensional nanostructures 13 includes two opposite end portions 132, 134. One of the end portions, e.g., 134 thereof is electrically connected with the cathode 12. Meanwhile, the other one end portion, e.g. 132 thereof is located away from the cathode 12 and has occupied polarized gap states, thereby allowing that other end portion 132 to function as a polarized electron emission tip. Advantageously, the one-dimensional nanostructures 13 are composed of open nanotubes with local occupied polarized gap states, nanowires with local occupied polarized gap states, or a mixture thereof. It is well known that an open nanotube has at least one open end, and a nanowire customarily has a ratio of length to diameter (i.e., aspect ratio) of no less than about 100.

Figure 2:
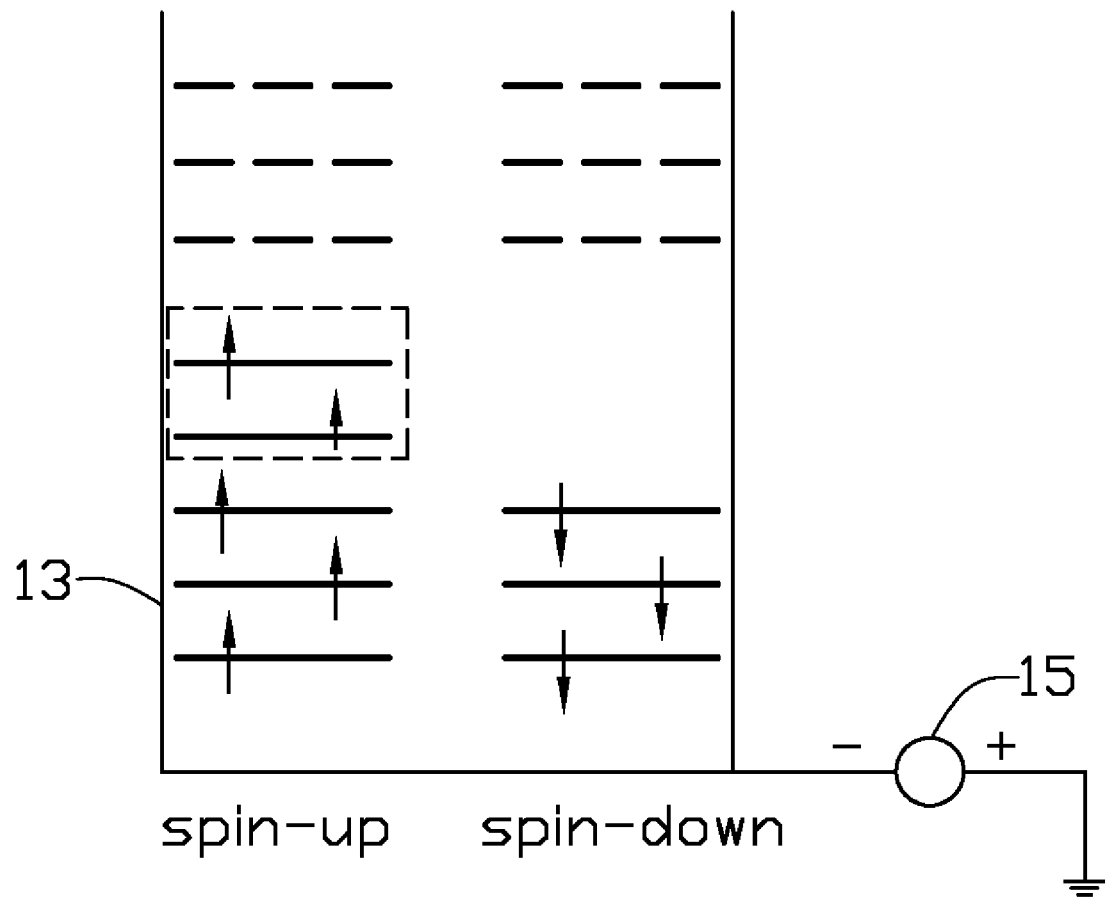
FIG. 2 shows a schematic band structure of a boron-rich-ended boron nitride nanotube of FIG. 1.

Referring to FIG. 2, in the illustrated embodiment, the one-dimensional nanostructures 13 are a plurality of open boron-rich-ended boron nitride nanotubes (B-rich-ended BNNTs) with locally occupied spin-polarized deep gap states (see the portion encased in a dashed and dotted rectangle in FIG. 2). Each of the open B-rich-ended BNNTs 13 has at least one open end portion, e.g., 132. The at least one open end portion 132 of each of the open B-rich-ended BNNTs 13 suitably has at least one isolated/unpaired boron atom and thereby results in the formation of occupied polarized gap states. Generally, in considering the chirality (i.e., a structural characteristic making it impossible to superimpose mirror image of that structure thereon) of an open BNNT 13, the open BNNT 13 usually is expressed as open (n, m) BNNT; where (n, m) is a chiral vector; and n, m both are integers ($0 \leq |m| < n$). Correspondingly, the open B-rich-ended BNNTs 13 can be expressed as open B-rich-ended (n, m) BNNTs. The open B-rich-ended (n, m) BNNTs 13 each has an induced stable chirality-dependent local magnetic property (i.e., local spin configuration) and a spin-splitting energy larger than 1 electron volt (eV) for the highest occupied molecular orbital, upon which spin-polarized electrons can be easily extracted from the open B-rich-ended (n, m) BNNTs 13.

Advantageously, for an open B-rich-ended (n, m) BNNT 13, a magnetic moment M (a unit is $\mu_B$) induced at the open end portion 132 of the B-rich-ended (n, m) BNNT satisfies the following conditions (1), (2) and (3):

(1) M=Modulus (n-m, m), if m≠0 and the result of Quotient (n-m, m) is even;

(2) M=m—Modulus (n-m, m), if m≠0 and the result of Quotient (n-m, m) is odd; and (3) M=Modulus (n, 2), if m=0.

The open end portions 132 of the open B-rich-ended (n, m) BNNT 13 usually has a degree of spin-polarization of no less than about 86%.

The anode 14 is disposed spaced apart from the cathode 12 (e.g., by a well-known spacer mechanism (not shown)). A gap in which the one-dimensional nanostructures 13 located is defined between the anode 14 and the cathode 12. The anode 14 advantageously has a through hole 142 defined therein, in order to expose the polarized electron emission tips (i.e., the open ends 132) of the open B-rich-ended (n, m) BNNTs 13. The anode 14 suitably is made from an electrically conductive material, including, for example, molybdenum (Mo) or niobium (Nb).

The magnetic field generator 16 is configured (i.e., structured and arranged) for generating a magnetic field to enable spins of the electrons in the occupied spin-polarized deep gap states of the open B-rich-ended (n, m) BNNTs 13 to align with each other along a direction of the magnetic field (as denoted by the arrow shown in FIG. 1). That is, the open B-rich-ended (n, m) BNNTs 13 are thereby configured for providing a magnetic field induction. The magnetic field generator 16 suitably includes a magnetic coil (not shown). The magnetic field generator 16, with the magnetic coil therein, is disposed surrounding the open B-rich-ended (n, m) BNNTs 13, and an axis thereof is substantially parallel to the tube axis of each of the B-rich-ended (n, m) BNNTs 13.

In operation, the spin-polarized electron source 10, as described above, is placed under a vacuum. The anode 14 is grounded, a predetermined negative bias voltage via a power supply 15 is applied to the cathode 12, and, thereby, an electric field is generated between the cathode 12 and the anode 14. Under an effect of the magnetic field induction provided by the magnetic field generator 16, spins of the electrons in the occupied spin-polarized deep gap states of the open end portions 132 are oriented along the direction of the magnetic field. Electrons having spins in the given direction can be extracted by the electric field from the open end portions 132 of the open B-rich-ended (n, m) BNNTs 13, and, accordingly, a continuous spin-polarized electron current/beam is obtained. The continuous spin-polarized electron current/beam will pass through the through hole 142. For an illustration purpose, an average nanotube-anode distance between the open end portions 132 of the open B-rich-ended (n, m) BNNTs 13 and the anode 14 is about 6 micrometers, and the negative bias voltage approximately is correspondingly 150 volts. The direction of the magnetic field is substantially parallel to the direction oriented from the cathode 12 to the anode 14, and the spins (as denoted by the multiple parallel arrows in FIG. 1) of the spin-polarized electrons in the spin-polarized electron current/beam are correspondingly aligned with the direction of the magnetic field. In addition, it is found out that a level of the predetermined negative bias voltage is relevant to the average nanotube-anode distance, the larger the average distance the higher the negative bias voltage is needed. The spins of the spin-polarized electrons in the continuous spin-polarized electron current/beam can be adjusted by changing the direction of the magnetic field.

Figure 3:
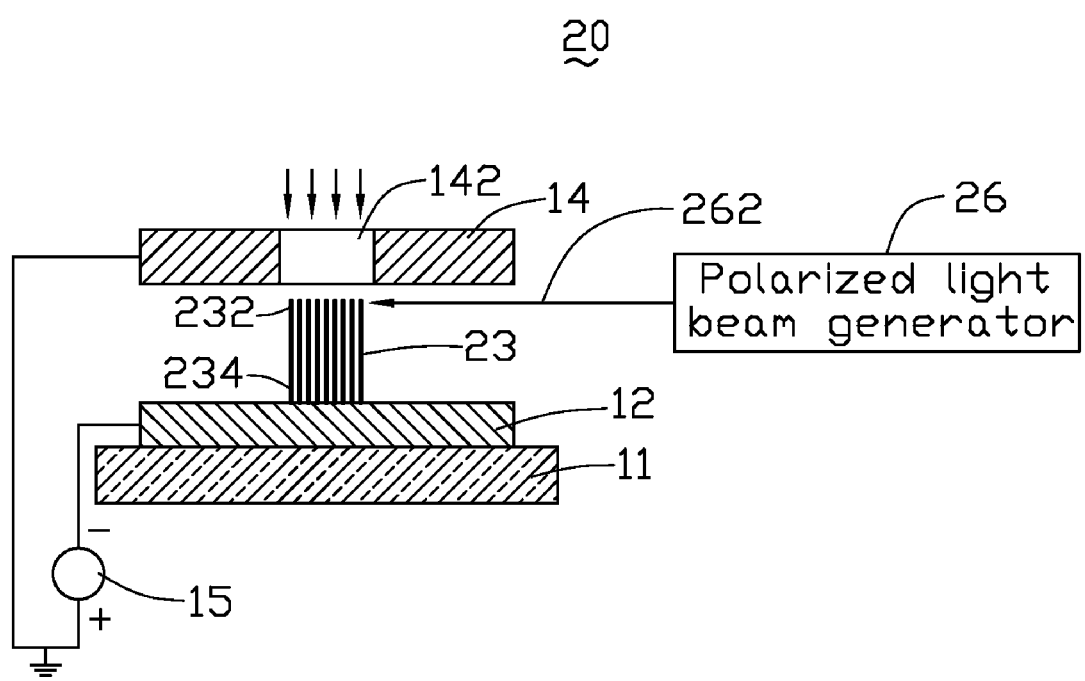
FIG. 3 is a schematic, cross-sectional view of a spin-polarized electron source, in accordance with a second preferred embodiment.

Referring to FIG. 3, a spin-polarized electron source 20, in accordance with a second preferred embodiment, is provided. The spin-polarized electron source 20 can realize continuous and efficient emission of a spin-polarized electron current/beam under an effect of a circularly polarized light beam excitation. In particular, the spin-polarized electron source 20 is similar to the spin-polarized electron source 10 and also includes a glass substrate 11, a cathode 12, and an anode 14. In addition, as seen in FIG. 3, the spin-polarized electron source 20 has other different parts, e.g., one-dimensional nanostructures 23 formed of a group III-V compound semiconductor with local unoccupied polarized gap states (i.e., polarized gap states being unoccupied by electrons and being localized), and a polarized light beam generator 26.

The one-dimensional nanostructures 23 of the group III-V compound semiconductor are electrically connected with the cathode 12 and are located in the gap defined between the cathode 12 and the anode 14. In particular, each of the one-dimensional nanostructures 23 includes two opposite end portions 232, 234. One of the end portions, e.g., 234 thereof is electrically connected with the cathode 12, and the other one end portion, e.g., 232 thereof is located/directed away from the cathode 12 and has unoccupied polarized gap states. Accordingly, the other end portion 232 is configured for functioning as a polarized electron emission tip. Advantageously, the one-dimensional nanostructures 23 are composed of open nanotubes with local unoccupied polarized gap states, nanowires with local unoccupied polarized gap states, or a mixture thereof.

Figure 4:
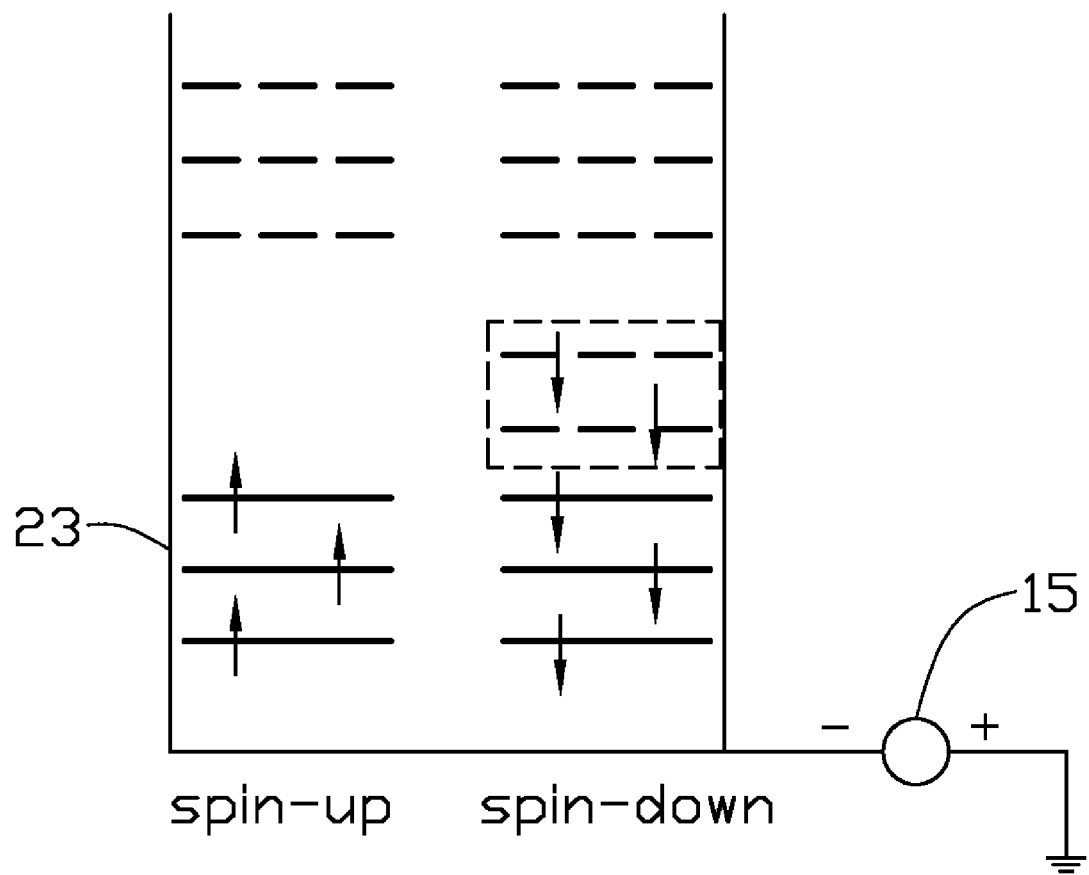
FIG. 4 shows a schematic band structure of a nitride-rich-ended boron nitride nanotube of FIG. 3.

Referring to FIG. 4, in the illustrated embodiment, the one-dimensional nanostructures 23 are a plurality of open nitride-rich-ended boron nitride nanotubes (N-rich-ended BNNTs) with unoccupied spin-polarized deep gap states (see the portion encased in a dashed and dotted rectangle in FIG. 4). Each of the open N-rich-ended BNNTs 23 has at least one open end portion, e.g., 232. The at least one open end portion 232 of each of the open N-rich-ended BNNTs 23 suitably has at least one isolated/unpaired nitride (N) atom and thereby results in the formation of unoccupied polarized gap states. In considering the chiralities of the open N-rich-ended BNNTs 23, the open N-rich-ended BNNTs 23 can be expressed as open N-rich-ended (n, m) BNNTs 23; where (n, m) is a chiral vector; and n, m both are integers ($0 \leq |m| < n$). The open N-rich-ended (n, m) BNNTs 23 each also has a stable chirality-dependent local magnetic property (i.e., local spin configuration) and a spin-splitting energy larger than 2.5 electron volts (eV) for the lowest unoccupied molecular orbital, upon which spin-polarized electrons can be easily extracted from the open N-rich-ended (n, m) BNNTs 23.

Advantageously, for an open N-rich-ended (n, m) BNNT 23, at the open end portion 232 of the open N-rich-ended (n, m) BNNT 23, the number of B—N pairs is m, and the number of isolated/unpaired N atoms is (n-m). A magnetic moment M (a unit is $\mu_B$) induced at the open end portion 232 of the N-rich-ended (n, m) BNNT satisfies the following conditions (4):

$$M = n - (4).$$

When the open end portions 232 (i.e., the polarized electron emission tips) of the open N-rich-ended (n, m) BNNT 23 is irradiated with a circularly polarized light beam having a predetermined photon energy, a high polarization at the open end portions 232 also can be achieved.

The polarized light beam generator 26 is configured for supplying a circularly polarized light beam 262 having a predetermined photon energy to irradiate the polarized electron emission tips of the open N-rich-ended (n, m) BNNTs 23. As such, the polarized light beam generator 26 is particularly configured for providing an effect of a circularly polarized light beam excitation. The polarized light generator 26 suitably includes a laser device and a quarter-wave plate. Accordingly, the circularly polarized light beam 262 can be produced by passing a laser beam (i.e., a linearly polarized light beam) provided by the laser device through a quarter-wave plate at an angle of 45° to the optical axis of the plate.

In operation, the spin-polarized electron source 20, as described above, is placed under a vacuum. The anode 14 is grounded, and a predetermined negative bias voltage, via a power supply 15, is applied to the cathode 12, and, thereby, an electric field is generated between the cathode 12 and the anode 14. Under an effect of a circularly polarized light beam excitation provided by the near-infrared circularly polarized light beam 262, electrons in the open end portions 232 (i.e., the polarized electron emission tips) of the open N-rich-ended (n, m) BNNTs 23 will be excited to the unoccupied spin-polarized deep gap states thereof. The spins of the excited electrons are dependent of the helicity of the circularly polarized light beam 262. In particular, an irradiation of a left-hand circularly polarized light beam onto the open end portions 232 can result in the formation of spin-down excited electrons (as denoted by the multiple parallel arrows in FIG. 3). Conversely, an irradiation of a right-hand circularly polarized light beam onto the polarized electron emission tips will result in the formation of spin-up excited electrons. The excited electrons having spins in the given direction can be extracted by the electric field from the open end portions 232 of the open N-rich-ended (n, m) BNNTs 23, and, thus, a continuous spin-polarized electron current/beam can be obtained. The continuous spin-polarized electron current/beam will pass through the through hole 142. For an illustration purpose, an average nanotube-anode distance between the open end portions 232 of the open N-rich-ended (n, m) BNNTs 23 and the anode 14 is about 6 micrometers, and the negative bias voltage approximately is correspondingly 150 volts.

It is understood to one of ordinary skill in the art that if the one-dimensional nanostructures 13 in accordance with the first embodiment or the one-dimensional nanostructures 23 in accordance with the second embodiment are configured to be a mixture of a one-dimensional nanostructure with local occupied polarized gap states and another one-dimensional nanostructure with local unoccupied polarized gap states, e.g., a mixture of open B-rich-ended BNNTs 23 and open N-rich-ended BNNTs 23, a continuous spin-polarized electron current/beam also can be obtained from the mixture via an extraction of electric field in cooperation with both the above-mentioned effect of the magnetic field induction and the predetermined circularly polarized light beam excitation.

Figure 5:
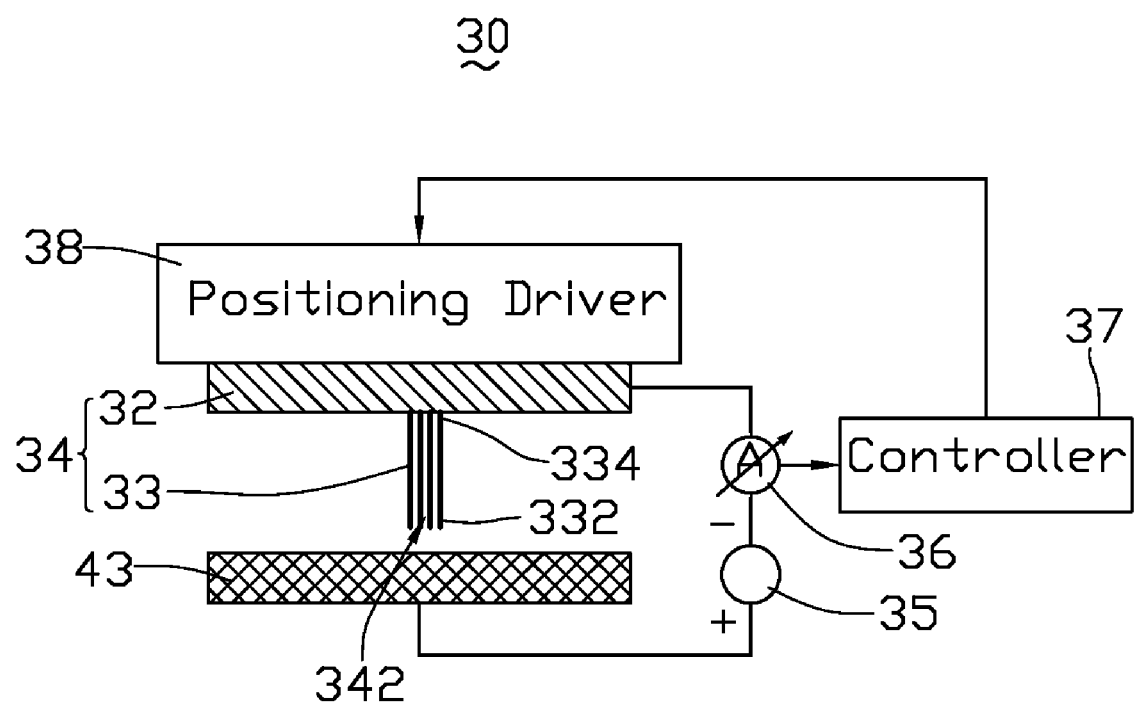
FIG. 5 is a schematic, cross-sectional view of a spin-polarized scanning tunneling microscope, in accordance with a third preferred embodiment.

Referring to FIG. 5, a spin-polarized scanning tunneling microscope 30, in accordance with a third preferred embodiment, is provided. The spin-polarized scanning tunneling microscope 30 includes an electrical conductor 32, one-dimensional nanostructures 33 formed of a group III-V compound semiconductor with local polarized gap states, a current detecting device 36, a controller 37, and a positioning driver 38. The assembly of the one-dimensional nanostructures 33 and the conductor 32 functions as a probe 34 and thereby can be used for detecting a surface magnetic structure of a magnetic sample 43.

The conductor 32 is electrically connected with the one-dimensional nanostructures 33. The conductor 32 advantageously is made, e.g., of an electrically conductive material, such as a silver paste.

The one-dimensional nanostructures 33 each include two opposite end portions 332, 334. The end portions 334 are electrically connected with the conductor 32. The other one end portions 332 are located/directed away from the conductor 32, have polarized gap states (i.e., occupied polarized gap states and/or unoccupied polarized gap states) associated therewith, and thereby act as a portion of the probe tip 342 for emitting or detecting polarized electrons. The one-dimensional nanostructures 33 advantageously are composed of open nanotubes, nanowires, or a combination thereof.

In the illustrated embodiment, the one-dimensional nanostructures 33 are composed of open (n, m) BNNTs 33 with local polarized gap states, and open end portions 332 of the open (n, m) BNNTs 33 constitute a probe tip 342. In particular, the one-dimensional nanostructures 33 are composed of open B-rich-ended (n, m) BNNTs, open N-rich-ended (n, m) BNNTs, or a mixture thereof. The open (n, m) BNNTs 33 are electrically connected with the conductor 32, and, accordingly, the assembly of the open (n, m) BNNTs 33 and the conductor 32 functions as the probe 34. Spin-polarized electron current/beam can be obtained from the probe tip 342 via an extraction of electric field in cooperation with the above-mentioned effect of the magnetic field induction and/or the circularly polarized light beam excitation.

The formation of the open (n, m) BNNTs 33 being electrically connected with the conductor 32 actually is a product of a series of sub-steps, as follows: in one example, open (n, m) BNNTs 33 and an electrically conductive material, e.g., a silver paste are mixed together to form a slurry. The slurry is screen printed on a substrate. The slurry is solidified on the substrate via sintering the combination of the slurry and the substrate at 350~600 degrees Celsius in an inert gas environment or a vacuum environment for 20~60 minutes. The solidified slurry is rubbed to expose the open ends of the open (n, m) BNNTs 33. As a result, the exposed open ends of the open (n, m) BNNTs 33 function as the probe tip 342 of the spin-polarized scanning tunneling microscope 30, and the solidified electrically conductive material correspondingly acts as the conductor 32.

In another example, a molybdenum oxide catalyst layer supported on a substrate is prepared. At least one (n, m) BNNT 33 is grown from the molybdenum oxide catalyst layer via a chemical vapor deposition process. The grown (n, m) BNNT 33 and the molybdenum oxide catalyst layer together are heat treated at a temperature of proximately 800 degrees Celsius in air for about 20 minutes, in order to open the end of the grown (n, m) BNNT 33 that is directed away from the catalyst layer. Accordingly, the open end of the grown (n, m) BNNT 33 acts as the probe tip 342, and the molybdenum oxide catalyst layer can correspondingly function as the conductor 32.

The current detecting device 36 is configured for detecting a tunneling current generated between the probe tip 342 and the magnetic sample 43 during the operation of the spin-polarized scanning tunneling microscope 30. The positioning driver 38 is configured for causing a relative movement between the probe tip 342 and the magnetic sample 43, e.g., driving the probe tip 342 to scan across an investigated surface of the magnetic sample 43. The positioning driver 38 is mechanically engaged with the conductor 32. The controller 37 is configured for receiving the tunneling currents detected by the current detecting device 36 and signaling a feed back signal to the positioning driver 38 in order to regulate the relative movement between the probe tip 342 and the magnetic sample 43. Additionally, the controller 37 can also output the registered levels of the tunneling currents to a peripheral device, e.g., a display.

In operation, the one-dimensional nanostructures 33 and the magnetic sample 43 of the spin-polarized scanning tunneling microscope 30 are placed under a vacuum. The open end portions 332 of the one-dimensional nanostructures 33 constitute the probe tip 342, and a gap between the probe tip 342 and the magnetic sample 43 has a width in the range from 0.1 to 10 nanometers. A working voltage is applied to the probe tip 342 and the magnetic sample 43 via a power supply 35, and, as such, an electric field is generated between the probe tip 342 and the magnetic sample 43. Because the probe tip 342 has occupied polarized gap states and/or unoccupied polarized gap states, under an extraction effect of the electric field in cooperation with an effect of a magnetic field induction and/or an effect of a circularly polarized light beam excitation, a spin-dependent tunneling current can be produced between the probe tip 342 and the magnetic sample 43. The positioning driver 38 moves the probe tip 342 to scan across the investigated surface of the magnetic sample 43 facing toward the probe tip 342, and, resultingly, the current detecting device 36 outputs the tunneling currents to the controller 37 in real time. The controller 37 receives the outputted tunneling currents and sends a feed back signal, again in real time, to the positioning driver 38 in order to regulate the movement of the probe tip 342, e.g., keeping the width of the gap between the probe tip 342 and the magnetic sample 43 stable. The controller 37 also outputs the tunneling currents, in real time, to a peripheral device (e.g., a display), and, thereby, a surface magnetic structure imaging of the magnetic sample 43 is obtained. In the illustrated embodiment, the spin-polarized scanning tunneling microscope 30 can achieve a high detection accuracy, due to the fact that the probe tip 342 (i.e., the open end portions 332 of the open (n, m) BNNTs 33) has a stable local magnetic property (i.e., local spin configuration) and that the stability of local magnetic property thereof is thus maintained while the probe tip 342 is interacting with the magnetic sample 43.

In addition, in order to improve the conductivity property of the open (n, m) BNNTs 13, 23, 33, in accordance with one of the above mentioned preferred embodiments, a functional doping of carbon atoms into tube bodies (i.e., portions between the two opposite ends) of the open (n, m) BNNTs can be carried out. The formation of carbon-doped open (n, m) BNNTs actually is a result of a series of sub-steps: (n, m) BNNTs are prepared via a chemical vapor deposition process, an arc discharge process, or a laser ablation process. The prepared (n, m) BNNTs are heat treated at a temperature of proximately 800 degrees Celsius in air for 20 minutes, in order to open the ends of the (n, m) BNNTs. The open (n, m) BNNTs are sealed in an evacuated (about $10^{-6}$ torr) quartz ampoule together with commercially obtained $C_{60}$ powder in about a 5:1 $C_{60}$: BNNTs mass ratio, and uniformly heated to an approximate temperature between 550 and 630 degrees Celsius for about 24 to about 48 hours. As a result, carbon-doped open (n, m) BNNTs are obtained. The carbon-doped open (n, m) BNNTs have an improved electron transport property, i.e., conductivity.

It is understood to one of ordinary skill in the art that the one-dimensional nanostructures 13, 23, 33, in accordance with one of the above described preferred embodiments, can be composed of other one-dimensional nanostructures of group III-V compound semiconductor such as open gallium nitride (GaN) nanotubes or GaN nanowires with matched polarized gap states, besides above mentioned open (n, m) BNNTs. Further, the one-dimensional nanostructures 13, 23, 33, in accordance with one of the above described preferred embodiments, can potentially be composed of one-dimensional nanostructures of group II-VI compound semiconductor with occupied polarized gap states or unoccupied polarized gap states.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the present invention.

What is claimed is:

1. A spin-polarized electron source, comprising:
   a cathode;
   a one-dimensional nanostructure comprised of a compound semiconductor with local polarized gap states, the one-dimensional nanostructure including a first end portion electrically connected with the cathode and a second end portion directed away from the cathode, the second end portion of the one-dimensional nanostructure functioning as a polarized electron emission tip and being configured for emitting a spin-polarized electron current/beam under an effect of selectably one of a magnetic field induction and a circularly polarized light beam excitation when a predetermined negative bias voltage is applied to the cathode.

2. The spin-polarized electron source of claim 1, wherein the second end portion of the one-dimensional nanostructure has occupied polarized gap states and is configured for correspondingly emitting the spin-polarized electron current/beam under the effect of the magnetic field induction.

3. The spin-polarized electron source of claim 2, wherein the one-dimensional nanostructure is one of an open nanotube, a nanowire, and a mixture thereof.

4. The spin-polarized electron source of claim 3, wherein the one-dimensional nanostructure is one of an open boron-rich-ended boron nitride nanotube, an open gallium nitride nanotube, and a gallium nitride nanowire.

5. The spin-polarized electron source of claim 4, wherein the one-dimensional nanostructure is an open boron-rich-ended boron nitride nanotube, the open boron-rich-ended boron nitride nanotube has a chiral vector of (n, m), and the second end portion of the open boron-rich-ended boron nitride nanotube has a magnetic moment M satisfying the following conditions (1), (2), and (3):
   (1) M=Modulus (n−m, m), if m≠0 and the result of Quotient (n−m, m) is even;
   (2) M=m−Modulus (n−m, m), if m≠0 and the result of Quotient (n−m, m) is odd; and
   (3) M=Modulus (n, 2), if m=0;
   wherein M, n, m all are integers and $0 \leq |m| < n$.

6. The spin-polarized electron source of claim 2, further comprising a magnetic field generator configured for generating a magnetic field and thereby providing the effect of the magnetic field induction to enable spins of electrons in the occupied polarized gap states to align with each other along a direction of the magnetic field.

7. The spin-polarized electron source of claim 1, wherein the second end portion of the one-dimensional nanostructure has unoccupied polarized gap states and is configured for correspondingly emitting the spin-polarized electron current/beam under the effect of the circularly polarized light beam excitation.

8. The spin-polarized electron source of claim 7, wherein the one-dimensional nanostructure is one of an open nanotube, a nanowire, and a mixture thereof.

9. The spin-polarized electron source of claim 8, wherein the one-dimensional nanostructure is one of an open nitride-rich-ended boron nitride nanotube, an open gallium nitride nanotube, and a gallium nitride nanowire.

10. The spin-polarized electron source of claim 9, wherein the one-dimensional nanostructure is an open nitride-rich-ended boron nitride nanotube, the open nitride-rich-ended boron nitride nanotube has a chiral vector of (n, m), and the second end portion of the open nitride-rich-ended boron nitride nanotube has a magnetic moment M satisfying the following condition:

$$M = n - m;$$

wherein M, n, m all are integers and $0 \leq |m| < n$.

11. The spin-polarized electron source of claim 7, further comprising a polarized light beam generator configured for generating a matched circularly polarized light beam to irradiate onto the second end portion and thereby providing the circularly polarized light beam excitation to excite electrons into the unoccupied polarized gap states and to enable spins of the excited electrons to align with each other dependent of a helicity of the circularly polarized light beam.

12. A spin-polarized scanning tunneling microscope configured for investigating a domain structure of a magnetic sample, comprising:
   a probe disposed opposite to a surface of the magnetic sample separated therefrom by a vacuum gap, the probe including a one-dimensional nanostructure comprised of a compound semiconductor with local polarized gap states, the one-dimensional nanostructure having an end portion adjacent to the surface of the magnetic sample and acting as a probe tip of the probe, the end portion being configured for producing a spin-dependent tunneling current under an effect of selectably one of a magnetic field induction and a circularly polarized light beam excitation when a working voltage is applied onto the probe and the sample;
   a positioning driver configured for causing a relative movement between the probe and the magnetic sample to enable the probe tip to scan across the surface of the magnetic sample;
   a current detecting device configured for detecting the tunneling current generated between the probe tip and the magnetic sample; and
   a controller configured for receiving the tunneling current from the current detecting device and signaling a feed back signal to the positioning driver in order to regulate the relative movement between the probe and the magnetic sample.

13. The spin-polarized scanning tunneling microscope of claim 12, wherein the one-dimensional nanostructure is one of an open nanotube, a nanowire, and a mixture thereof.

14. The spin-polarized scanning tunneling microscope of claim 13, wherein the one-dimensional nanostructure is one of an open boron nitride nanotube, an open gallium nitride nanotube, and a gallium nitride nanowire.

15. The spin-polarized scanning tunneling microscope of claim 14, wherein the one-dimensional nanostructure is an open boron nitride nanotube, and the open boron nitride nanotube is one of an open boron-rich-ended boron nitride nanotube and an open nitride-rich-ended boron nitride nanotube.

16. The spin-polarized scanning tunneling microscope of claim 15, wherein the open boron nitride nanotube has a tube body portion extending from the end portion thereof and along a direction away from the surface of the sample, and the tube body portion is doped with carbon atoms.

17. A spin-polarized electron source, comprising:
a cathode;
one-dimensional nanostructures each including a first end portion electrically connected with the cathode and a second end portion extending from the cathode, the second end portions of the one-dimensional nanostructures having polarized gap states and thereby being configured for generating a spin-polarized electron current/beam under an effect selectably one of a magnetic field induction and a circularly polarized light beam excitation when a predetermined negative bias voltage being applied to the cathode.

18. The spin-polarized electron source of claim 17, further comprising at least one of a magnetic field generator and a polarized light beam generator, the magnetic field generator being configured for providing the effect of the magnetic field induction, and the polarized light beam generator being configured for providing the effect of the circularly polarized light beam excitation.

19. The spin-polarized electron source of claim 18, wherein the one-dimensional nanostructures are each composed of one of an open boron nitride nanotube, an open gallium nitride nanotube, and a gallium nitride nanowire.

* * * * *